United States Patent [19]
Haga

[11] Patent Number: 5,552,688
[45] Date of Patent: Sep. 3, 1996

[54] MACHINING PROGRAM EXECUTION METHOD FOR AN NC DEVICE

[75] Inventor: Makoto Haga, Oshino-mura, Japan

[73] Assignee: Fanuc Ltd., Japan

[21] Appl. No.: 307,661

[22] PCT Filed: Jan. 21, 1994

[86] PCT No.: PCT/JP94/00083

§ 371 Date: Sep. 22, 1994

§ 102(e) Date: Sep. 22, 1994

[87] PCT Pub. No.: WO94/17459

PCT Pub. Date: Apr. 8, 1994

[30] Foreign Application Priority Data

Jan. 26, 1993 [JP] Japan ................... 5-028418

[51] Int. Cl.$^6$ ................... G05B 19/18
[52] U.S. Cl. ............. 318/569; 318/567; 318/520; 318/562; 318/600
[58] Field of Search ............. 318/569, 567, 318/570, 562, 600; 364/130, 148, 192, 242.91, 261, 414.04

[56] References Cited

U.S. PATENT DOCUMENTS

| | | | |
|---|---|---|---|
| 4,068,297 | 1/1978 | Komiya ................... | 318/569 |
| 4,564,913 | 1/1986 | Yomugida et al. ........ | 364/148 |
| 4,868,760 | 9/1989 | Obara ................... | 318/474.04 |
| 5,315,503 | 5/1994 | Kato et al. .............. | 364/192 |
| 5,331,540 | 7/1994 | Tanaka et al. ........... | 364/148 |

FOREIGN PATENT DOCUMENTS

| | | |
|---|---|---|
| 0207998 | 1/1987 | European Pat. Off. . |
| 354957 | 7/1986 | Germany . |
| 2-244303 | 9/1990 | Japan . |
| 3-136725 | 6/1991 | Japan . |

Primary Examiner—William Shoop, Jr.
Assistant Examiner—Karen Masih
Attorney, Agent, or Firm—Staas & Halsey

[57] ABSTRACT

A machining program execution method for an NC device, in which parameter values are automatically modified in accordance with the machining types in continuously executing machining operations of different machining types, such as rough machining, intermediate finish machining, finish machining, etc., by the NC device. A memory in the NC device is previously stored with the parameters to be modified in accordance with the machining types and the parameter values for each machining type, and machining programs and machining types are associated with each other and inputted to the NC device. At the start of execution of the individual machining programs, the machining types of the machining programs as objects of execution are discriminated by the designation of the machining type for the machining program and the parameter values are automatically modified in accordance with the machining type of the machining program. Thus, the machining operation of a machine tool can always be controlled by using optimum parameters.

2 Claims, 4 Drawing Sheets

FIG. 4

MODIFICATION PARAMETER LIST DISPLAY

| PARAMETER NUMBER | ROUGH MACHINING | INTERMEDIATE FINISH MACHINING | FINISH MACHINING | HIGH-SPEED AND HIGH-ACCURACY ROUGH MACHINING | HIGH-SPEED AND HIGH-ACCURACY INTERMEDIATE FINISH MACHINING | HIGH-SPEED AND HIGH-ACCURACY FINISH MACHINING |
|---|---|---|---|---|---|---|
| 1422 | A1 | A2 | A3 | AF1 | AF2 | AF3 |
| 1430 | B1 | B2 | B3 | BF1 | BF2 | BF3 |
| 1450 | C1 | C2 | C3 | CF1 | CF2 | CF3 |
| 1645 | D1 | D2 | D3 | DF1 | DF2 | DF3 |
| 1735 | E1 | E2 | E3 | EF1 | EF2 | EF3 |
| 1835 | F1 | F2 | F3 | FF1 | FF2 | FF3 |
| 2000 | G1 | G2 | G3 | GF1 | GF2 | GF3 |
| 3000 | H1 | H2 | H3 | HF1 | HF2 | HF3 |

FIG. 5

MACHINING PROGRAM MANAGEMENT DISPLAY

| PROGRAM NUMBER | MACHINING METHOD | PROGRAM NUMBER | MACHINING METHOD |
|---|---|---|---|
| 0001 | ROUGH | 4001 | FINISH |
| 0111 | FINISH | 4111 | ROUGH |
| 1000 | ROUGH | 5000 | FINISH |
| 2001 | INTERMEDIATE FINISH | 5001 | ROUGH |
| 2111 | ROUGH | 5111 | INTERMEDIATE FINISH |
| 3000 | FINISH | 6000 | INTERMEDIATE FINISH |
| 3111 | ROUGH | 6001 | ROUGH |
| 4000 | INTERMEDIATE FINISH | 6111 | FINISH |
| 4011 | HIGH-SPEED AND HIGH-ACCURACY ROUGH | | |
| 3010 | HIGH-SPEED AND HIGH-ACCURACY INTERMEDIATE FINISH | | |

MACHINING PROGRAM EXECUTION METHOD FOR AN NC DEVICE

BACKGROUND OF THE INVENTION

1. Field of the Invention

The present invention relates to a machining program execution method for an NC device.

2. Description of the Related Art

There are various machining programs, which are executed by an NC device, including machining programs for rough machining, intermediate finish machining, finish machining, etc. In order to effectuate machining control of a machine tool by means of the NC device, parameters for the feed rate, acceleration/deceleration control, main spindle control, etc., required for the drive control of various parts of the machine tool, must be set previously in the NC device, besides the machining program.

Conventionally, the parameters are initially set beforehand in the NC device by the manufacturer, in consideration of the convenience and wishes of a user who utilizes the NC device or the machine tool. As long as the values of the parameters are kept fixed, however, it is hard to meet all of machining conditions, including rough machining, intermediate finish machining, finish machining, etc.

To cope with this problem, the NC device is provided with a function for modifying the setting of the parameters.

According to the conventional NC device, after bringing the NC device to a data input mode or an emergency stop state, desired parameter values are inputted by assigning parameter numbers by means of softkeys or ten-keys of a manual data input device attached to the NC device, or the parameter values are reloaded by setting a parameter tape in a tape reader to read the desired parameter values. All these operations are carried out manually, and the NC device is in an alarm state during these operations, so that the parameter reloading operation cannot be carried out in parallel with the execution of the machining programs.

In the case of lathing or milling operation, the machining processings, such as the rough machining, intermediate finish machining, finish machining, etc., can be executed in succession by repeatedly executing the same machining programs, while program-controlling the revolution speed, offset, etc. However, as discussed previously, in the case of a conventional NC device, the parameters can not be reloaded during the execution of the machining programs. Even during intervals between individual machining processings, such as rough machining, intermediate finish machining, finish machining, etc., the setting of parameter tape and operation of the manual data input device need to be done by the operator. Therefore, resetting the parameters in response to the change of the machining processing is practically impossible without interrupting automatic and continuous execution of machining processings.

Conventionally, in continuously performing the automatic operation for the individual machining processings, set values meeting the requirements of the machining accuracy of the finish machining are set as parameters in advance, and machining control is effected using parameters for the finish machining throughout the machining processings including the rough machining, intermediate finish machining, finish machining, etc. Naturally, however, the time required for the entire machining becomes longer than necessary, bringing poor machining efficiency. On the other hand, if a series of machining control operations are carried out with the parameters set for the rough machining in order to save the time required for machining, proper finish machining can not be achieved.

Modern NC devices and machine tools have advanced functions, which enable a series of machining processings to be executed continuously by means of a tool changing function of the machine tools, program editing function of the NC devices, etc. even when different tools or machining programs needed to be used depending on the machining processings, including the rough machining, intermediate finish machining, finish machining, etc. So far, however, the function for automatically re-setting the parameters has not been made available. Thus, there still remains a problem such that the required machining time increases or the finish machining is unsatisfactory when the machining operation is required to be carried out continuously. Even in the case where the machining processings are carried out individually, it is very troublesome for the operator to set the parameters manually every time the machining programs are changed.

SUMMARY OF THE INVENTION

The present invention provides a machining program execution method for an NC device, which lightens the operator's burden associated with parameter setting operation, and in which machining processings, such as rough machining, intermediate finish machining, finish machining, etc., can be executed in succession by means of the NC device without increasing the time for machining or degrading the machining accuracy.

A machining program execution method according to the present invention comprises the steps of: storing the values of a plurality of parameters required for executing machining programs by an NC device in a first memory means in the NC device; determining and storing parameters to be modified in accordance with the machining types, from said plurality of parameters, and the values of said parameters to be set for each machining type in a second memory means in the NC device; programming a parameter modification command for designating the machining type in the machining programs; modifying the parameter values to be modified in accordance with the machining types, from the plurality of parameter values stored in said first memory means, into parameter values in accordance with the machining type designated by said parameter modification command, from the parameter values stored in said second memory means, when said parameter modification command is read in said machining programs during the execution of the machining programs by the NC device; and executing the machining programs by the NC device using the parameter values thus modified.

Moreover, the designation of machining types for the individual machining programs are set and stored in third memory means in the NC device, the machining types associated with the machining programs are discriminated by the designations stored in the third memory means at the start of the execution of the machining programs, and the parameter values used in the machining can be modified in accordance width the machining types.

BRIEF DESCRIPTION OF THE DRAWINGS

FIG. 4 is a diagram showing an example of parameter setting data displayed in the NC device shown in FIG. 1; and FIG. 5 is a diagram showing machining type setting data displayed for setting the corresponding relations between machining programs and machining types in the NC device.

DETAILED DESCRIPTION OF THE PREFERRED EMBODIMENT

Figure 1:
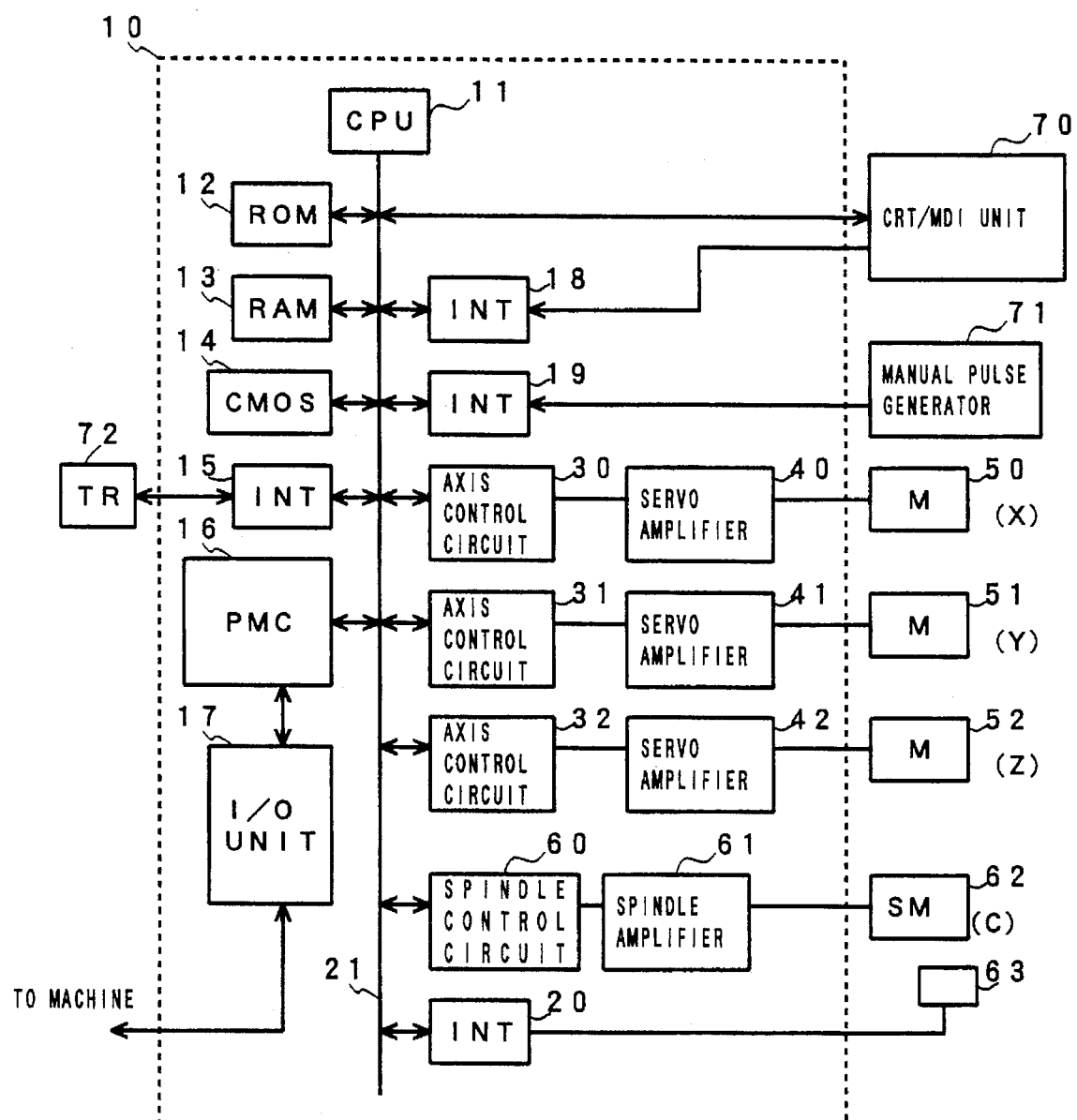
FIG. 1 is a block diagram showing an NC device for carrying out a method according to the present invention and the principal part of a machine tool operatively controlled by the NC device.

Referring to FIG. 1, a CPU 11 reads out a system program stored in a ROM 12 through a bus 21, and generally controls an NC device 10 in accordance with this system program. A RAM 13 is loaded with temporary computational data, display data and various data inputted through a CRT/MDI unit 70 by an operator. The CRT/MDI unit 70 is a manual data input device which is provided with a CRT graphic display, a keyboard, and various soft keys. A CMOS memory 14 is a nonvolatile memory which is backed up by a battery, and capable of maintaining stored data even when the NC device 10 is disconnected from the power supply. The CMOS memory 14 stores an NC machining program read through an interface 15, an NC machining program inputted through the CRT/MDI unit 70, the values of parameters required for the drive control of a machine tool, etc. The ROM 12 is loaded with various system programs for carrying out a data input mode processing required in creating and editing the NC machining programs, a reproducing mode processing for automatic operation, etc.

The interface 15 is provided for external equipment which can be connected to the NC device 10, and is connected with external equipment 72, such as a paper tape reader, paper tape puncher, external storage unit, etc. The NC machining programs and the like are read from the paper tape reader and the external storage unit through the interface 15, and the NC machining programs edited in the NC device 10 are delivered to the paper tape puncher and the external storage unit.

A PMC (programmable machine controller) 16 controls auxiliary devices on the machine tool side, e.g., actuators such as a robot hand for tool changing, in accordance with sequence program stored in the NC device 10. More specifically, in accordance with M, S and T functions assigned the NC machining programs the PMC 16 converts commands from the sequence program into signals for the auxiliary devices, and outputs the signals to the auxiliary devices through an input/output unit 17. In response to these:output signals, the auxiliary devices, such as the various actuators, are actuated. In response to signals from limit switches installed on the body of the machine tool, the auxiliary devices and various switches on a control panel attached to the machine tool, necessary processings are executed and transferred to the processor 11.

Image signals for the current positions of individual axes of the machine tool, alarms, image data, etc. are delivered to the CRT/MDI unit 70, and are displayed on the graphic display thereof. The interface 18 receives data from the keyboard of the CRT/MDI unit 70, and delivers them to the processor 11. Also, a so-called automatic programming operation can be performed by starting the system programs for automatic programming stored in the ROM 12 to cause an interactive picture to be displayed on the graphic display of the CRT/MDI unit 70, thereby allowing simple data for the product shape and the like to be inputted to create the NC machining programs are created interactively. The interface 19 is connected to a manual pulse generator 71, and receives pulses from the manual pulse generator 71. The manual pulse generator 71 is mounted on the control panel of the machine tool body, and is used to position moving parts of the machine tool precisely by controlling the individual axes in accordance with pulses distributed by manual operation.

Axis control circuits 30 to 32 receive movement commands for the individual axes from the processor 11, and deliver the commands for the individual axes to servo amplifiers 40 to 42. On receiving these commands, the servo amplifiers 40 to 42 drive servomotors 50 to 52 for moving individual axes of a table. The servomotors 50 to 52 for the individual axes individually contain pulse coders for position detection, and position signals from the pulse coders are fed back as a pulse train. In some cases, a linear scale is used as a position detector. Moreover, speed signals can be generated through F/V (frequency/velocity) conversion of the pulse train. In FIG. 1, description of feedback of these position signals and speed feedback is omitted.

A spindle control circuit 60 receives a main spindle rotation command for the machine tool, and delivers a spindle speed signal to a spindle amplifier 61. On receiving this spindle speed signal, the spindle amplifier 61 causes, a main spindle motor 62 of the machine tool to rotate at an ordered rotating speed. A position coder 63 is connected to the main spindle motor 62 through gears, belts, etc. The position coder 63 outputs feedback pulses synchronously with the rotation of the main spindle. The feedback pulses are read through an interface 20 by the processor 11. In settling the rotational position of the main spindle at a predetermined position assigned according to the NC machining programs and the like, one rotation signal from the position coder 63 is detected, and position control for the main spindle, that is, C-axis control, is carried out through the processing by the processor 11, whereby the main spindle can be stopped and held in the predetermined position for positioning.

Among the parameters stored in the CMOS memory 14, those parameters which are to be modified in accordance with the differences of machining processings, such as rough machining, intermediate finish machining, finish machining, etc., and machining methods, such as standard machining, high-speed, high-accuracy machining, etc., include parameters related to the feed rate, adjustment of speed control, main spindle control, etc. In the following, the kind of machining depending on the difference in the machining processing or machining method or combination of machining processing and machining method is referred to as a machining type.

Parameter values relating to the feed rate, acceleration/deceleration control and main spindle control, as well as in accordance with the machining types are set and stored in the CMOS memory 14 including a first memory device and a third memory device.

As machining types, there are standard rough machining, standard intermediate finish machining, standard finish machining, high-speed and high-accuracy rough machining, high-speed and high-accuracy intermediate finish machining, high-speed and high-accuracy finish machining, standard machining regardless of machining processing and high-speed and high-accuracy machining regardless of machining processing, which are derived from the combination of the above machining processing and above machining method, and the parameter values are set in accordance with various machining types. Among these parameter values, the parameter values for the standard machining not relating to the machining processing and the high-speed and high-accuracy machining are initialized in advance as reference parameter values by the manufacturer.

All the parameter values can be rewritten. Thus, the NC device 10 may be shipped with all the parameter values unsettled so that all the parameter values, including the individual reference parameter values, can be initialized by the user's operation. Alternatively, the user's convenience may be researched prior to the delivery of the NC device 10 so that the manufacturer can initialize all the parameter values thereafter. In the present embodiment, two types of reference parameters can be set, that is, one for standard machining and the other for high-speed and high-accuracy machining. Thus, in setting the individual standard parameter values, the user sets and inputs the parameter values specifying whether they are for standard machining or high-speed and high-accuracy machining, as well as assignment of parameter numbers through the CRT/MDI unit 70 in the conventional manner.

FIG. 4 is a diagram showing an example of parameter setting data on a display used in operations for selecting parameters, which require modification depending on the machining types, and setting and storing (including initialization and modification of setting) the parameter values for the individual parameters. These data are displayed on the graphic display of the CRT/MDI unit 70 through the processing by the processor 11 in accordance with the system programs in the ROM 12, when the user selects an operational item "PARAMETER SETTING DISPLAY" by operating of the softkeys of the CRT/MDI unit 70 in a data input mode of the NC device 10. In the stage of the initialization, those parameters which require modification depending on the machining types are undefined, and the parameter values for the individual parameters are not set, so that all the display area of the graphic display except the region for the name of display and guidances are left blank.

In effecting the initialization, the operator first selects those parameters which require modification in accordance with the machining types, with reference to a manual for the parameters and the like, and inputs the parameter numbers assigned to those parameters by means of ten-keys of the CRT/MDI unit 70. Then, the operator determines the parameter values to be set for the parameters concerned such as the parameter values for the standard rough machining, standard intermediate finish machining, standard finish machining, high-speed and high-accuracy rough machining, high-speed and high-accuracy intermediate finish machining, high-speed and high-accuracy finish machining, and inputs the values by means of the ten-keys. The number "1422" one of the parameter numbers shown in FIG. 4 is an example of a parameter which defines the maximum feed rate of each axis, and the parameter values must be modified depending on the machining types. Thereafter, the operator repeatedly executes the same operation, and operates the CRT/MDI unit 70 to input the parameter numbers corresponding to the parameters which require modification depending on the machining types and the parameter values to be set for the individual parameters. When the operator operates a setting completion key after finishing the setting operation, those data temporarily stored in the buffer of the CRT/MDI unit 70, including a second memory device are transmitted to the processor 11 through the interface 18, and a write processing by means of the processor 11 is carried out. The CMOS memory 14 is previously loaded with a parameter setting file having a data array equivalent to the setting picture shown in FIG. 4 and corresponding to the number (total number) of the parameters. On receiving the data from the CRT/MDI unit 70, the processor 11 temporarily resets all modification flags of the parameter setting file, then sets the modification flags for the parameter numbers of the selected parameters which require modification, and writes the individual parameter values set for the parameters in their corresponding positions of the parameter setting file.

Also in modifying or canceling the data initialized once, the operator invokes the parameter setting display, and causes the graphic display of the CRT/MDI unit 70 to display it in the same manner as aforesaid. Since the initializing operation is already completed in this case, the processor 11 causes the graphic display to display the parameter numbers set with the modification flags and the parameter values corresponding thereto, in accordance with the data in the parameter setting file of the CMOS memory 14, as shown in FIG. 4. Referring to this data setting display, the operator executes additional entries of the parameter numbers of the parameters which require modification depending on the machining types, entry of the parameter values for those parameters, operation for modifying the set parameter values for the parameters already selected as objects of modification, operation for erasing the parameter numbers of the parameters to be excluded from the objects of modification, etc. When the operator operates the setting completion key after finishing the re-setting operation, the processor 11 receives the data from the CRT/MDI unit 70 in the same manner as in the initialization, and resets all the modification flags of the parameter setting file once. Then, based on the data received this time, the processor 11 sets the modification flags for the parameter numbers of the parameters which require modification, and writes the individual parameter values set for the parameters in their corresponding positions of the parameter setting file. In the parameter setting file of the CMOS memory 14, therefore, the modification flags for the parameters corresponding to the parameter numbers erased by the present modifying operation are reset. Also, the modification flags are set again for the parameter having undergone the modification of the parameter values only, and their corresponding storage regions are overwritten with new parameter values set correspondingly. Moreover, modification flags are set anew for additionally selected parameters as objects of modification, parameter values set correspondingly are newly written in their corresponding storage regions; and the initially set data are maintained without change for the parameter values which have not been modified. This is one instance among various file management and data reloading systems which have already been available.

The operator previously programs a setting modification command for assigning the machining type at the top of each machining program with which the parameter values must be modified for the drive control of the machine tool. A code for the setting modification command used in the present embodiment is "G111 P[n];". The Section "G111" is a command corresponding to the setting modification command; the section "P[n];" is an operand for assigning the machining type, and the machining type is dependent on the value of the variable n. There are corresponding relations between n and the machining types such that n as 1, 2, 3, 4, 5, 6 and 7 respectively correspond to the standard rough machining, standard intermediate finish machining, standard finish machining, high-speed and high-accuracy rough machining, high-speed and high-accuracy intermediate finish machining, high-speed and high-accuracy finish machining, and high-speed and high-accuracy machining not related to the machining processing.

Figure 2:
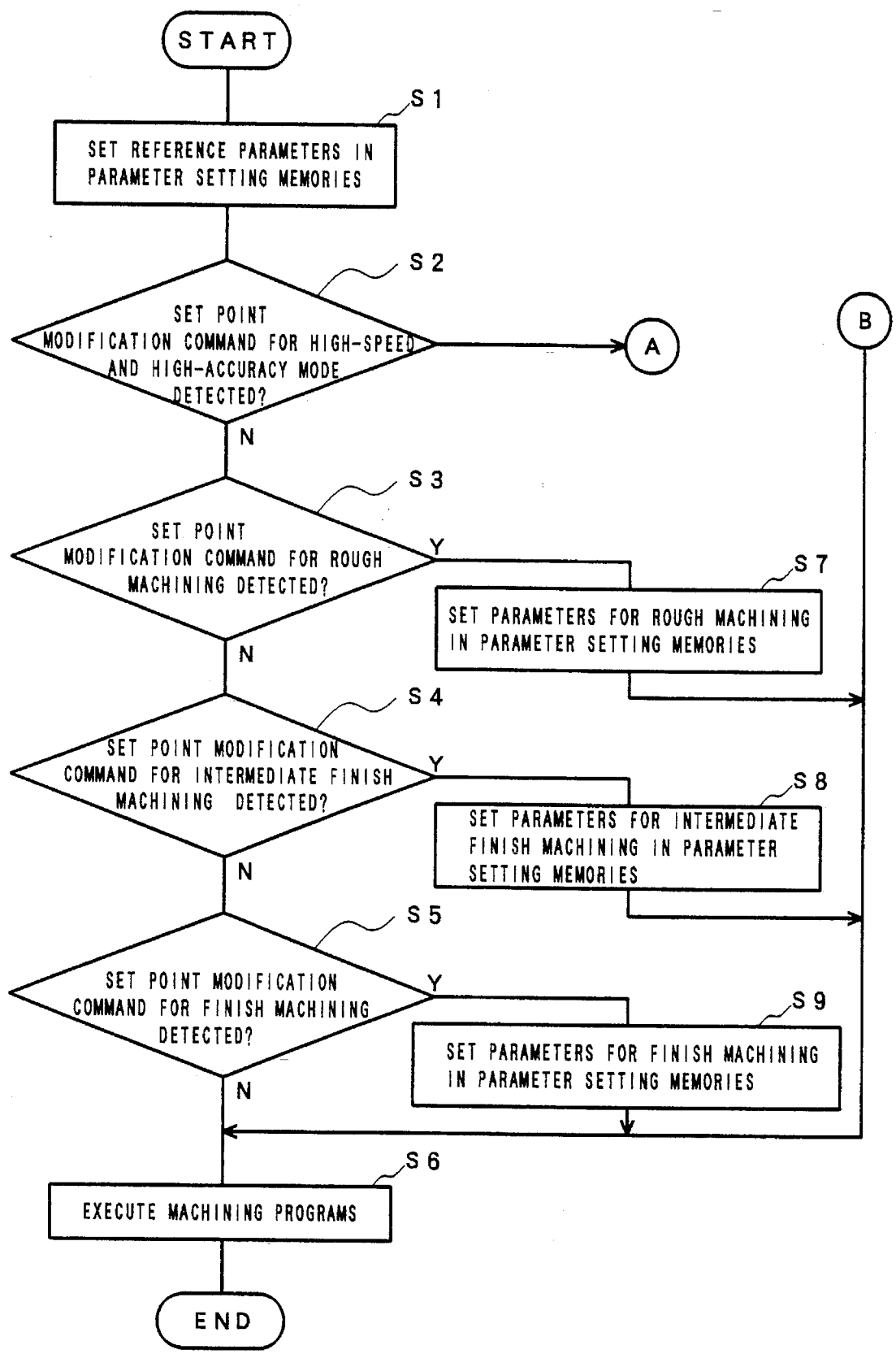
FIG. 2 is a flow chart showing an outline of an automatic operation processing executed by the NC device shown in FIG. 1.
Figure 3:
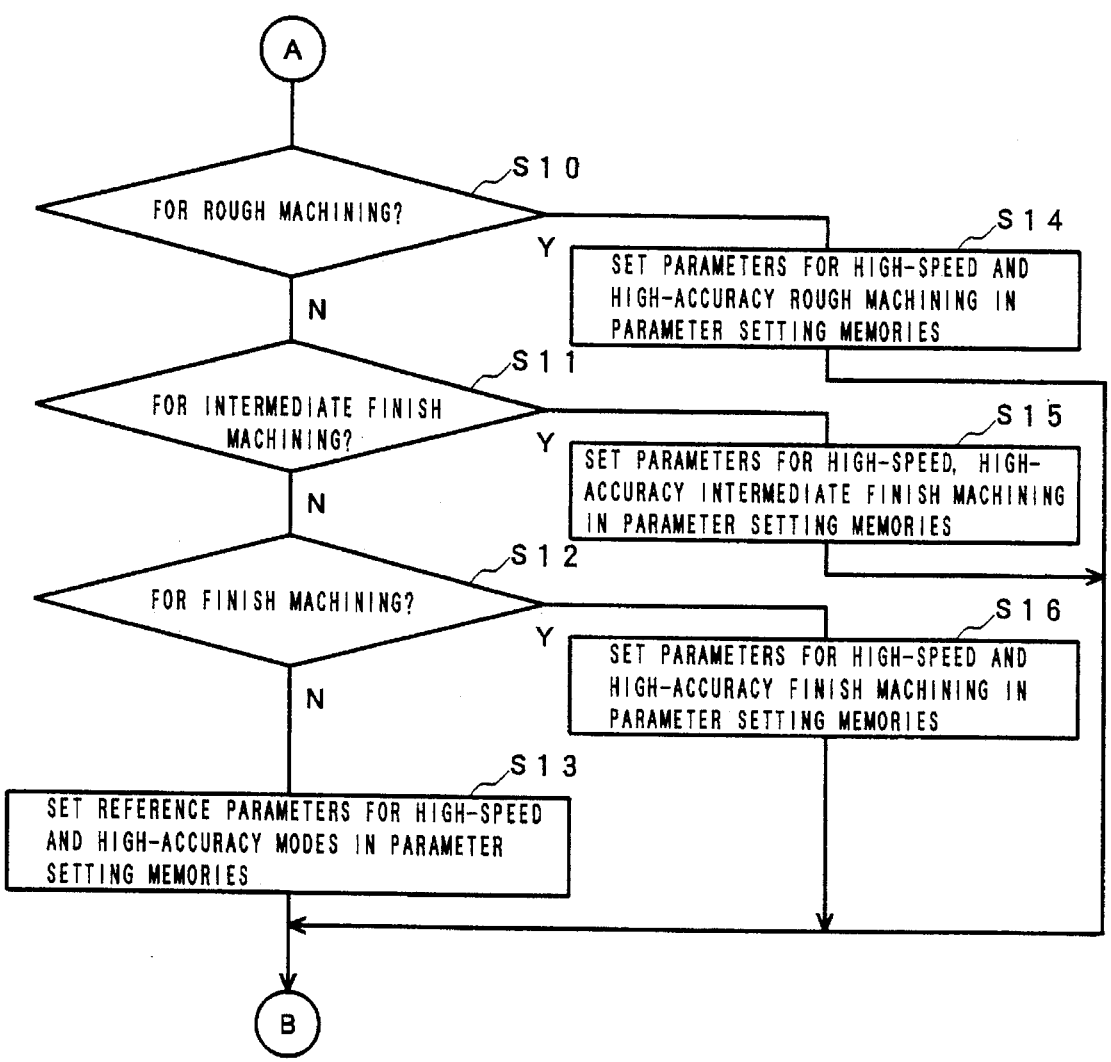
FIG. 3 is a continuation of the flow chart of FIG. 2.

FIGS. 2 and 3 are flow charts showing an outline of an automatic operation processing which the processor 11 carries out in accordance with control programs of the ROM 12, in the reproducing mode processing, in which the NC device 10 controls the drive of the machine tool and executes the machining programs. Referring now to these flow charts, a machining program execution method according to the present embodiment will be described.

The NC device 10 can continuously execute a number of machining programs, e.g., machining programs for rough machining with different contents, machining programs for intermediate finish machining, machining programs for finish machining, etc., through schedule management by means of a cell controller, and the like, or continuously execute the rough machining, intermediate finish machining, finish machining, etc. by repeatedly executing the machining program with the same contents, by varying selected tools, codes for setting modification commands, etc. In this case, the processing shown in FIGS. 2 and 3 is carried out with every execution of each machining program and with every repetition of the same machining program (including the first cycle).

After starting the automatic operation processing, the processor 11 first sets the reference parameter values for the standard machining corresponding to the individual parameters in all of execution parameter setting memories for the individual parameters in the CMOS memory 14, thereby, starting to read a given machining program in Step S1. Then, in Step S2, the processor 11 determines whether or not a setting modification command for any of the high-speed and high-accuracy modes, that is, "G111 P[n]; " with the value of n ranging from 4 to 7, is programmed at the top of the given machining program. If setting modification command for a high-speed and high-accuracy mode is not programmed, the processor 11 advances to Step S3, and determines whether or not a setting modification command "G111 P[1];" for the standard rough machining is programmed.

If the setting modification command "G111 P[1];" for the standard rough machining is programmed, the processor 11 advances to Step S7, whereupon it identifies the on-off state of the modification flags for the individual parameters, with reference to the parameter setting file of the CMOS memory 14, and resets the parameter values for the standard rough machining of the corresponding parameter setting file in the individual execution parameter setting memories corresponding to the parameters with the modification flags set therefor.

If the setting modification command "G111 P[1];" for the standard rough machining is read when the parameter setting file is set in the manner shown in FIG. 4, for example, a parameter value "A1" for the standard rough machining is re-set in place of the reference parameter values for the standard machining, as a new value of the parameter for defining the maximum feed rate of each axis, in the execution parameter setting memory corresponding to the parameter number "1422", since a modification flag is set for the parameter with the parameter number "1422". Likewise, parameter values "B1", "C1", . . . , "H1" for the standard rough machining are re-set in place of the reference parameter values for the standard machining, in the execution parameter setting memories corresponding to parameter numbers "1430", "1450", . . . , "3000", respectively. However, in the execution parameter setting memories corresponding to the other parameters with no modification flags set therefor, e.g., parameter numbers "1423", "1424", . . . , "1429", the reference parameter values for the standard machining set in the processing of Step S1 are maintained without change.

If the decision in Step S3 is NO, on the other hand, the processor 11 determines in Step S4 whether or not a setting modification command "G111 P[2];" for the standard intermediate finish machining is programmed. If the setting modification command for the standard intermediate finish machining is programmed, the processor 11 advances to Step S8, whereupon it identifies the on-off state of the modification flags in the same processing as in Step S7, and re-sets the parameter values for the standard intermediate finish machining of the corresponding parameter setting file in the individual execution parameter setting memories corresponding to the parameters with the modification flags set therefor.

Moreover, if the result of the decision in Step S4 is also NO, the processor 11 advances to Step S5, and determines whether or not a setting modification command "G111 P[3];" for the standard finish machining is programmed. If the setting modification command for the standard finish machining is programmed, the processor 11 advances to Step S9, whereupon it identifies the on-off state of the modification flags in the same processing as in Steps S7 and S8, and re-sets the parameter values for the standard finish machining of the corresponding parameter setting file in the individual execution parameter setting memories corresponding to the parameters with the modification flags set therefor. If the setting modification command for the standard finish machining is not programmed, however, the reference parameter values for the standard machining set in the processing of Step S1 are maintained without change for all the execution parameter setting memories.

If the decision in Step S2 is YES, that is, if it is concluded that a setting modification command for a high-speed and high-accuracy mode is programmed at the top of the machining:program, the processor 11 determines, in discrimination processings of Steps S10 to S12, whether the setting modification command for the high-speed and high-accuracy machining is a setting modification command "G111 P[4];" for the high-speed and high-accuracy rough machining (Step S10), or a setting modification command "G111 P[5];" for the high-speed, high-accuracy intermediate finish machining (Step S11), or a setting modification command "G111 P[6];" for the high-speed and high-accuracy finish machining (Step S12), in the same manner as aforesaid. In response to the decision in each of steps S10 to S12, the parameter values of the corresponding parameter setting file are re-set in the individual execution parameter setting memories corresponding to the parameters with the modification flags set therefor (Steps S14 to S16). If the setting modification command is none of the aforesaid ones, it is concluded that a setting modification command "G111 P[7]; " for the high-speed and high-accuracy machining regardless of the machining processing. Thereupon, in Step S13 the corresponding reference parameter values for the high-speed and high-accuracy machining are re-set in the individual execution parameter setting memories corresponding to the parameters with the modification flags set therefor.

Thereafter the processor 11 proceeds to Step S6, whereupon it executes the machining programs in the same manner as the conventional one, in accordance with the parameter values set in the individual execution parameter setting memories and controls the feed rate, acceleration/deceleration, etc. of the servomotors 50 to 52 for the individual axes of the machine tool and the main spindle motor 62, thereby causing the machine tool to perform machining operation.

In the embodiment described above, the parameters are re-set by programming the setting modification commands for assigning the machining types on the machining programs; however, the NC device 10 can be made to perform the same processing operation of the above-described embodiment by having it previously stored with the corresponding relations between the machining programs and the machining types.

FIG. 5 shows a machining type setting display for setting machining programs and machining types relating to each other in an NC device 10 according to another embodiment of the present invention. In this embodiment, a setting picture such as the one shown in FIG. 5 is displayed on a graphic display of a CRT/MDI unit 70, and the machining types corresponding to the program numbers of the machining programs are set by operating various function keys, ten-keys, etc., whereby the machining programs and the machining types are stored relating to each other in a machining type setting file of a CMOS memory 14.

During the execution of the machining programs, a processor 11, after having started to read the machining programs, detects the machining types corresponding to the machining programs by referring to the machining type setting file on the basis of the program numbers of the machining programs, and carries out processings corresponding to Steps S7 to S9 and Steps S13 to S16 of aforesaid embodiment in accordance with the machining types.

According to the machining program execution method of the present invention, the machining control of the machine tool can be affected by using optimum parameters and without increasing the time required for machining or degrading the machining accuracy even in the case where the machining processings, including the rough machining, intermediate finish machining, finish machining, etc., are executed in succession by means of the NC device. Moreover, the set parameter values need not be modified by means of the manual data input device or the like every time a machining program is executed, whereby the operator's burden can be lightened.

We claim:

1. A machining program execution method for an NC device, comprising the steps of:
   (a) for a standard machining type, storing a set of values respectively corresponding to a set of parameters required for executing machining programs by an NC device in a first memory means in the NC device;
   (b) for each of a plurality of non-standard machining types, determining a group of said set of parameters of said standard machining type which need to be modified in accordance with the non-standard machining type and modifying and storing a group of said set of values respectively corresponding to said group of parameters in accordance with the non-standard machining type, in a second memory means in the NC device;
   (c) programming a parameter modification command for designating one of the plurality of non-standard machining types in the machining programs;
   (d) reading said parameter modification command in said machining programs;
   (e) automatically replacing the group of values in said set of values stored in said first memory means corresponding to said designated one non-standard machining type with said modified group of values stored in said second memory means corresponding to said designated one non-standard machining type, when said parameter modification command is read in said machining programs during an execution of the machining programs by the NC device; and
   (f) executing the machining programs by the NC device using the group of values replaced in said step (e).

2. A machining program execution method for an NC device, comprising the steps of:
   (a) for a standard machining type, storing a set of values respectively corresponding to a set of parameters required for executing machining programs by an NC device in a first memory means in the NC device;
   (b) for each of a plurality of non-standard machining types, determining a group of said set of parameters of said standard machining type which need to be modified in accordance with the non-standard machining type and modifying and storing a group of said set of values respectively corresponding to said group of parameters in accordance with the non-standard machining type, in a second memory means in the NC device;
   (c) setting designations of said non-standard machining types for the corresponding machining programs and storing the designations in a third memory means in the NC device;
   (d) discriminating one of the non-standard machining types for a corresponding one of the machining programs to be executed referring to the designations stored in said third memory means at a start of an execution of the one machining program;
   (e) automatically replacing the group of values in said set of values stored in said first memory means corresponding to said discriminated one non-standard machining type with said modified group of values stored in said second memory means corresponding to said discriminated one non-standard machining type; and
   (f) executing the machining programs using the group of values replaced in said step (e).

* * * * *